United States Patent
Kaji et al.

[11] Patent Number: 6,131,059
[45] Date of Patent: Oct. 10, 2000

[54] STEERING ANGLE MIDDLE POINT DETECTING DEVICE AND POWER STEERING APPARATUS

[75] Inventors: Hiroaki Kaji, Yamatokooriyama; Masahiko Sakamaki, Yao, both of Japan

[73] Assignee: Koyo Seiko Co., Ltd., Osaka, Japan

[21] Appl. No.: 09/368,082

[22] Filed: Aug. 3, 1999

[30] Foreign Application Priority Data

Aug. 3, 1998 [JP] Japan ................................. 10-219447

[51] Int. Cl.⁷ .................................................. B62D 11/00
[52] U.S. Cl. ........................... 701/41; 180/443; 180/444; 180/446; 180/404; 180/422; 318/432; 318/422; 318/489; 318/663
[58] Field of Search ................................. 701/36, 41, 42, 701/43, 44; 180/446, 422, 443, 444, 404; 318/603, 432, 489, 422; 364/424.03, 424.04; 303/140, 146

[56] References Cited

U.S. PATENT DOCUMENTS

| | | | |
|---|---|---|---|
| 5,913,913 | 7/1999 | Okanoue et al. | 701/41 |
| 5,920,174 | 6/1999 | Kawada et al. | 318/663 |
| 5,978,721 | 11/1999 | Kagawa et al. | 701/41 |
| 5,984,042 | 11/1999 | Nashimoto et al. | 180/446 |
| 5,988,310 | 11/1999 | Nishino et al. | 180/443 |
| 5,996,725 | 12/1999 | Nishino et al. | 180/446 |
| 6,006,146 | 12/1999 | Usui et al. | 701/29 |
| 6,012,541 | 1/2000 | Nishioka et al. | 180/404 |
| 6,015,023 | 1/2000 | Mukai et al. | 180/446 |
| 6,017,101 | 1/2000 | Matsuda | 303/140 |
| 6,018,691 | 1/2000 | Yamamoto et al. | 701/41 |
| 6,029,767 | 2/2000 | Kifuku | 180/443 |
| 6,032,756 | 3/2000 | Nshimura et al. | 180/446 |
| 6,039,144 | 3/2000 | Chandy et al. | 180/446 |
| 6,041,883 | 3/2000 | Yokota et al. | 180/422 |
| 6,041,884 | 3/2000 | Shimizu et al. | 180/443 |
| 6,041,887 | 3/2000 | Kojo et al. | 180/446 |

FOREIGN PATENT DOCUMENTS

| | | |
|---|---|---|
| A2-197465 | 8/1990 | Japan . |
| A6-43188 | 6/1994 | Japan . |
| A8-198129 | 8/1996 | Japan . |

*Primary Examiner*—William A. Cuchlinski, Jr.
*Assistant Examiner*—Ronnie Mancho
*Attorney, Agent, or Firm*—Birch, Stewart, Kolasch & Birch, LLP

[57] ABSTRACT

The present invention provides a steering angle middle point detecting device which does not need a torque sensor, can detect a steering angle middle point with high precision without being affected by driving habits of drivers and road conditions, and can reduce memory size, and a power steering apparatus having the device. A continuous time period during which the vehicle speed is higher than a predetermined value and the steering angular velocity is lower than a predetermined value is counted, and each time the counted time has reached a predetermined time period, a detected steering angle and current are stored in a first memory. Each time the number of pairs of the steering angle and current has reached a predetermined number, the steering angle of the pair including the minimum current is stored in a second memory, the average value of the stored steering angles is found, and the resulting average value or the steering angle closest to the average value that is selected from the second memory is defined as a steering angle middle point.

16 Claims, 7 Drawing Sheets

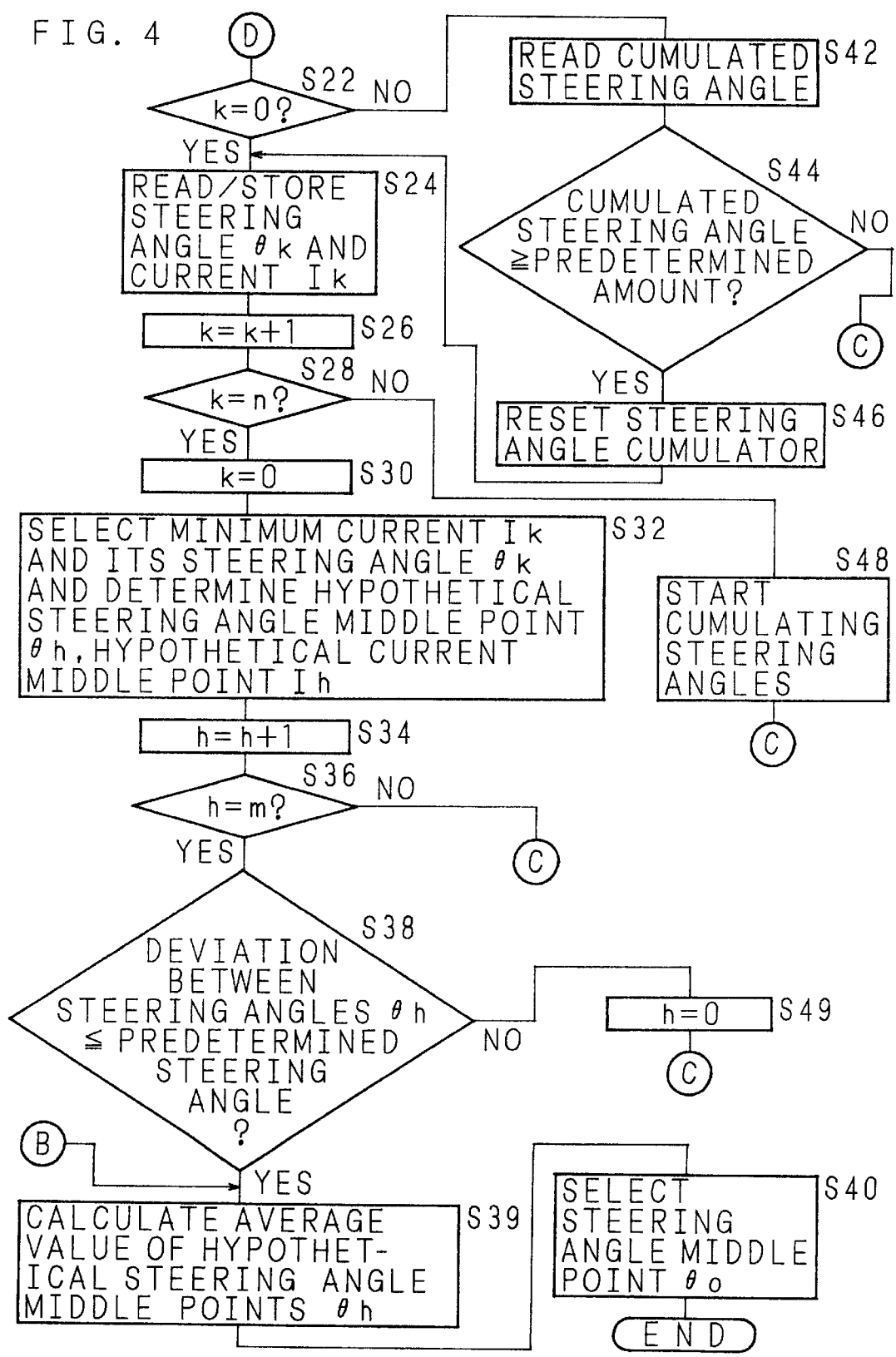

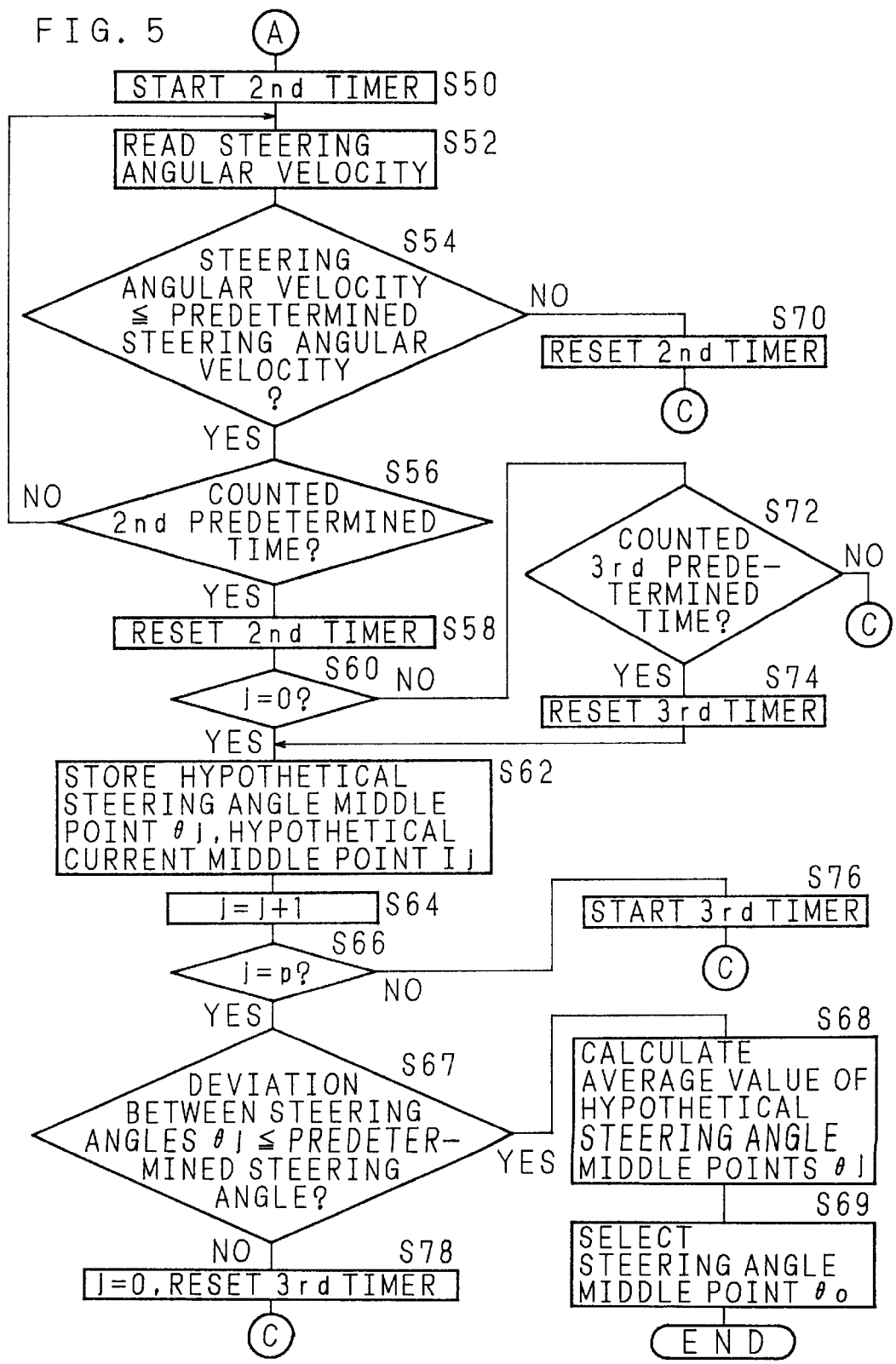

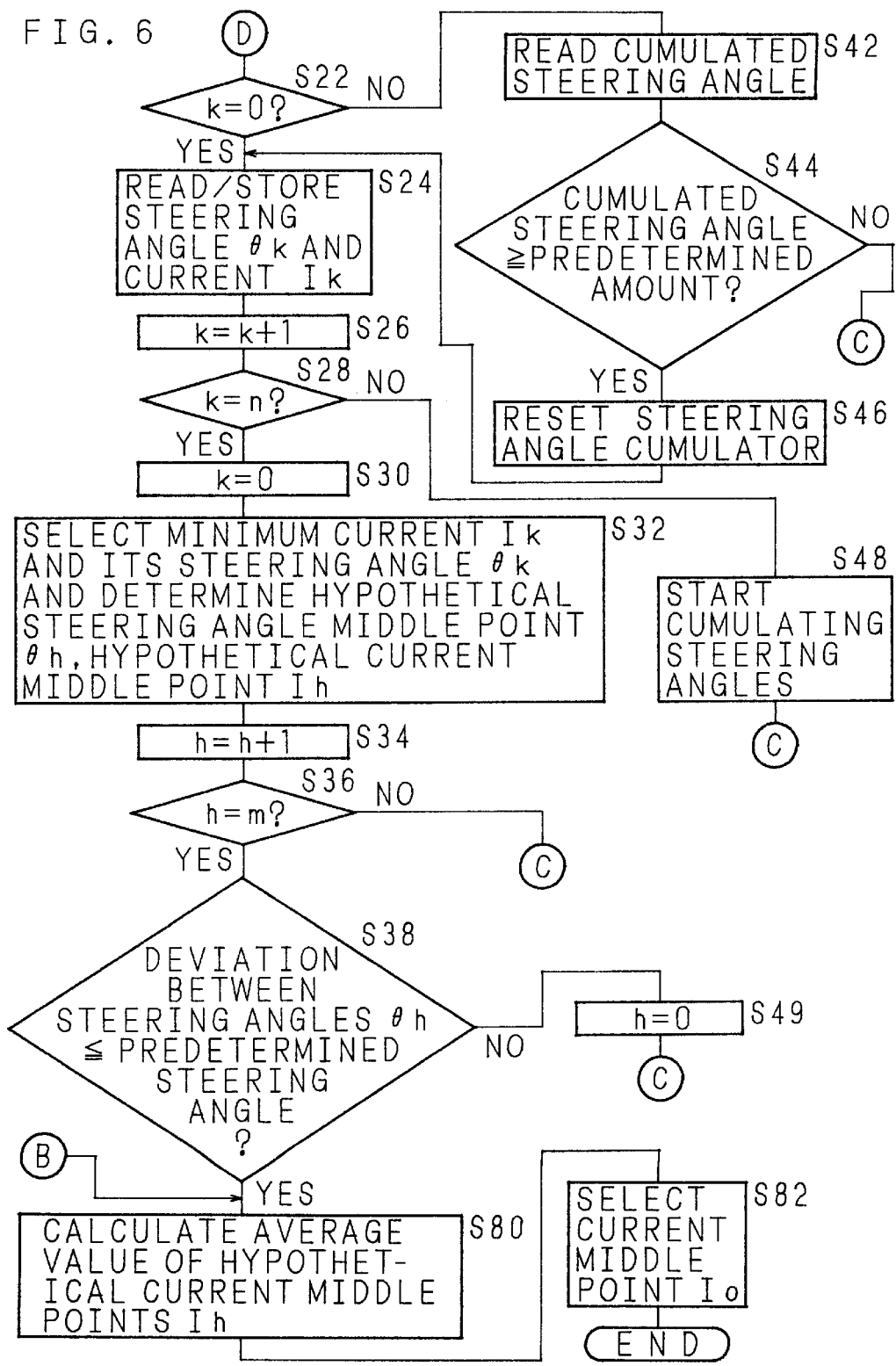

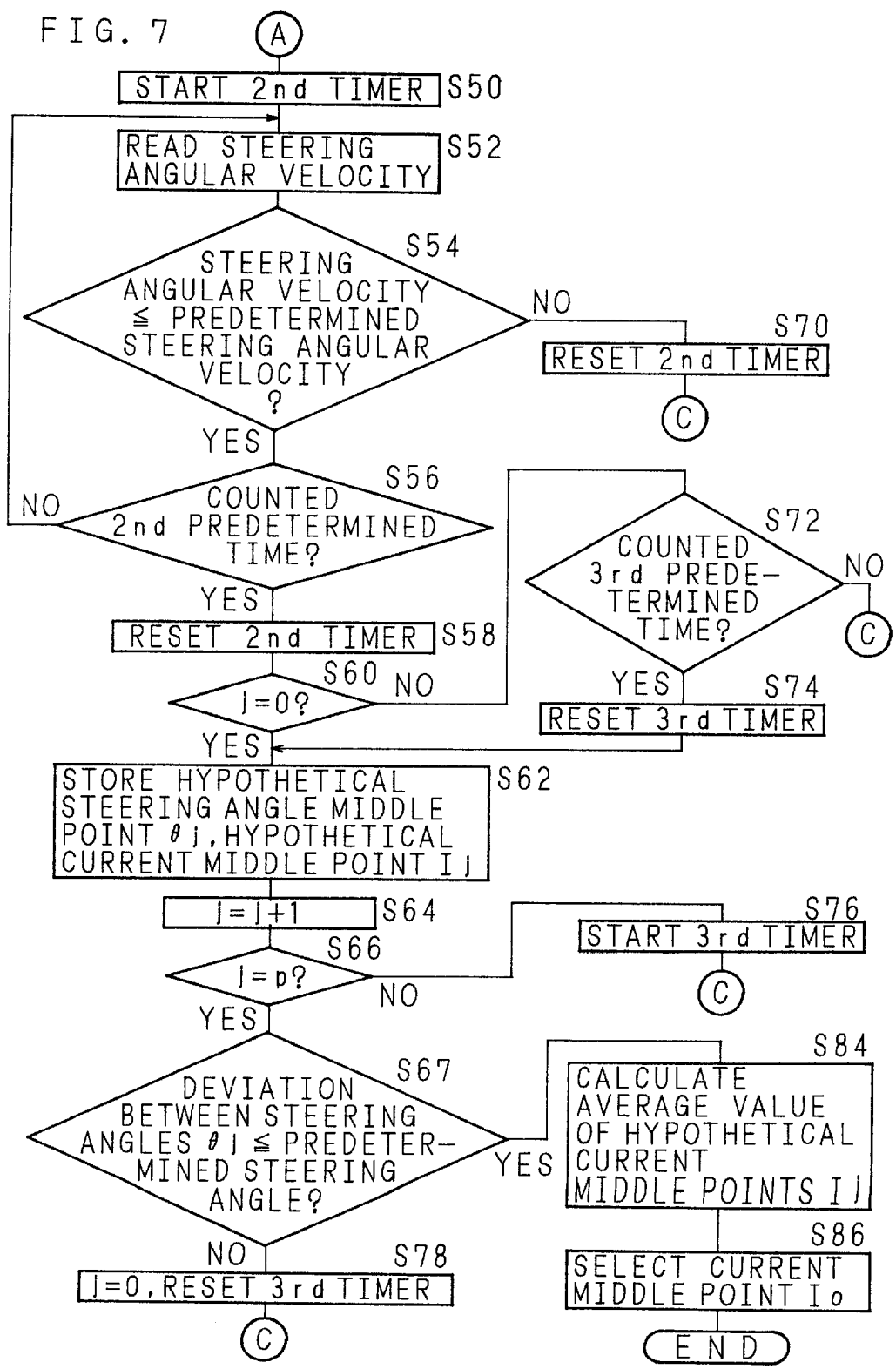

STEERING ANGLE MIDDLE POINT DETECTING DEVICE AND POWER STEERING APPARATUS

BACKGROUND OF THE INVENTION

1. Field of the Invention

The present invention relates to a steering angle middle point detecting device for detecting a steering angle middle point of a steering wheel while a vehicle travels straight ahead, and more particularly concerns a power steering apparatus having such a steering angle middle point detecting device.

2. Description of the Background Art

For example, in a power steering apparatus which assists steering by using an electric-motor-driven hydraulic pump as a generation source of oil pressure, when a vehicle travels straight ahead with the steering wheel not being operated, an unloaded (no-load) current flowing through the electric motor has to be set in order to control the electric motor.

Moreover, in the case when there is an offset between an actual steering angle middle point and a steering angle middle point that has been set so as to provide control for imparting a steering assist force in accordance with the amount of variation of the steering angle from the steering angle middle point of the steering wheel while the vehicle travels straight ahead with the steering wheel not being operated, a compensating operation for the offset is carried out so as to prevent variations in the steering characteristic.

With respect to a device for detecting such a steering angle middle point, Japanese Patent Application Laid-Open No. 2-197465(1990) discloses a device, which is provided with a torque sensor for detecting a steering torque and a steering angle sensor for detecting a steering angle and which detects the steering angle middle point based upon a steering angle when the steering torque is smaller than a preset value, by utilizing the fact that the steering torque becomes smaller at the steering middle point.

Moreover, Japanese Patent Application Examined No. 6-43188(1994) discloses a method in which a steering angle sensor successively detects the steering angle and the steering middle point is specified based upon a statistical distribution of the frequency of occurrences of the detected steering angle data.

Furthermore, Japanese Patent Application Laid-Open No. 8-198129(1996) discloses a method in which: steering angle data is successively detected within a preset time based upon the origin that has been provisionally set, the variation width of the steering angle data is found and compared with a preset value, a hypothetical steering angle middle point is detected from the steering angle data that has been detected when the variation width is smaller than the preset value, and the steering angle middle point is detected based upon the frequency of appearances of a plurality of hypothetical steering angle middle points that have been time-sequentially found.

However, the above-mentioned conventional techniques have problems in which: a torque sensor is required to detect the steering angle middle point; a great deal of steering angle data need to be sampled so as to obtain an accurate statistical distribution, with the result that much time and memory size for the data have to be provided; and sampling data are greatly varied depending on driving habits of drivers and road conditions.

Additionally, the above-mentioned problems may arise not only in so-called power steering apparatuses which carry out a steering assist by using an electric-motor-driven hydraulic pump as the generation source of oil pressure, but also in so-called electric power steering apparatuses which use an electric motor as the generation source of a steering assist force.

BRIEF SUMMARY OF THE INVENTION

The present invention has been devised to solve the above-mentioned problems and its objective is to provide a steering angle middle point detecting device which does not need a torque sensor, can detect a steering angle middle point with high precision without being affected by driving habits of drivers and road conditions, and can reduce the memory size, and a power steering apparatus in combination with the device.

The steering angle middle point detecting device of the present invention, which is a device for detecting the steering angle middle point of the steering wheel of a vehicle having a power steering apparatus which assists steering by an electric motor provided therein, while the vehicle travels straight, is provided with: a steering angle detector for detecting the steering angle of the steering wheel; a vehicle speed detector for detecting a speed of the vehicle; a vehicle speed comparator for comparing the speed detected by the vehicle speed detector with a predetermined vehicle speed; a current detector for detecting a drive current of the electric motor; a steering angular velocity calculator for calculating a steering angular velocity based on the steering angle detected by the steering angle detector; a steering angular velocity comparator for comparing the steering angular velocity calculated by the steering angular velocity calculator with a predetermined steering angular velocity; a timer which counts a continuous time period during which, based on the results of comparison in the steering angular velocity comparator, the steering angular velocity calculated by the steering angular velocity calculator is lower than the predetermined steering angular velocity, and also during which, based upon the results of comparison in the vehicle speed comparator, the speed detected by the vehicle speed detector is higher than the predetermined speed; a first memory for storing the steering angle detected by the steering angle detector and the current detected by the current detector each time the timer counts a predetermined time; a second memory which, each time the number of pairs of the steering angle and current stored in the first memory has reached a first predetermined number, stores the pair including the minimum current; a statistical value calculator for calculating a statistical value of the steering angles stored in the second memory; and a selector for selecting either the statistical value calculated by the statistical value calculator or one of the steering angles stored in the second memory as a steering angle middle point.

In this steering angle middle point detecting device, the timer calculates the time period during which, the steering angular velocity calculated by the steering angular velocity calculator is lower than the predetermined steering angular velocity, and also during which, the speed detected by the vehicle speed detector is higher than the predetermined speed. The first memory stores the steering angle detected by the steering angle detector and the current detected by the current detector each time the timer counts a predetermined time. Each time the number of the pairs stored in the first memory has reached a predetermined number, the second memory stores a pair having the minimum current. The statistical value calculator calculates a statistical value of the steering angles stored in the second memory, and the selector selects either the statistical value calculated by the statistical value calculator or one of the steering angles stored in the second memory as a steering angle middle point. Therefore, no torque sensor is required, it is possible to detect the steering angle middle point with high precision without being affected by driving habits of drivers and road conditions, and it is also possible to reduce the memory size.

Another steering angle middle point detecting device of the present invention, which is a device for detecting the steering angle middle point of the steering wheel of a vehicle having a power steering apparatus while the vehicle travels straight as a current middle point of an electric motor for steering assistance provided in the power steering apparatus, is provided with: a steering angle detector for detecting the steering angle of the steering wheel; a vehicle speed detector for detecting a speed of the vehicle; a vehicle speed comparator for comparing the speed detected by the vehicle speed detector with a predetermined speed; a current detector for detecting a drive current of the electric motor; a steering angular velocity calculator for calculating a steering angular velocity based on the steering angle detected by the steering angle detector; a steering angular velocity comparator for comparing the steering angular velocity calculated by the steering angular velocity calculator with a predetermined steering angular velocity; a timer which counts a continuous time period during which, based on the results of comparison in the steering angular velocity comparator, the steering angular velocity calculated by the steering angular velocity calculator is lower than the predetermined steering angular velocity, and also during which, based on the results of comparison in the vehicle speed comparator, the speed detected by the vehicle speed detector is higher than the predetermined speed; a first memory for storing the steering angle detected by the steering angle detector and the current detected by the current detector each time the timer has counted a predetermined time; a second memory which, each time the number of pairs of the steering angle and current stored in the first memory has reached a first predetermined number, stores the pair including the minimum current; a statistical value calculator for calculating a statistical value of the currents stored in the second memory; and a selector for selecting either the statistical value calculated by the statistical value calculator or one of the currents stored in the second memory as a current middle point.

In this steering angle middle point detecting device, the statistical value calculator and the selector calculate the statistical value of the currents instead of the steering angles, and make a selection as the current middle point corresponding to the steering angle middle point. Therefore, no torque sensor is required, it is possible to detect the steering angle middle point with high precision without being affected by driving habits of drivers and road conditions, and it is also possible to reduce the memory size.

Still another steering angle middle point detecting device of the present invention is further provided with: a steering angle cumulator that cumulates the steering angles detected by the steering angle detector, from the time when the first memory stored the pair of the steering angle and current until the timer has counted the predetermined time; and a cumulated value comparator for comparing the cumulated value cumulated by the steering angle cumulator with a predetermined value, wherein the first memory stores the steering angle detected by the steering angle detector and the current detected by the current detector based on the results of comparison in the cumulated value comparator when the cumulated value is greater than the predetermined value.

In this steering angle middle point detecting device, from time when the first memory stored the pair until the timer has counted the predetermined time, the steering angle cumulator cumulates the steering angles detected by the steering angle detector. The cumulated value comparator compares the cumulated value cumulated by the steering angle cumulator with the predetermined value, and the first memory stores the steering angle detected by the steering angle detector and the current detected by the current detector based on the results of comparison in the cumulated value comparator when the cumulated value is greater than the predetermined value. Therefore, no torque sensor is required, it is possible to detect the steering angle middle point with high precision without being affected by driving habits of drivers and road conditions, and it is also possible to reduce the memory size. Moreover, even in the case when, like the vehicle is circling at constant rate, the steering wheel is held at a position other than the steering angle middle point and many revising steering operations are carried out in the proximity of this holding position, no offset in detection occurs with respect to the steering angle middle point.

Still another steering angle middle point detecting device of the present invention is provided with: a deviation calculator for calculating the deviation of the steering angles of the second predetermined number each time the number of pairs of the steering angle and current stored in the first memory has reached a second predetermined number; and a deviation comparator for comparing the deviation calculated by the deviation calculator with a predetermined deviation, wherein when the results of comparison in the deviation comparator show that the deviation is smaller than the predetermined deviation, the statistical value calculator is allowed to calculate the statistical value.

In this steering angle middle point detecting device, each time the number of the pairs stored in the first memory has reached the second predetermined number, the deviation calculator calculates the deviation of the steering angles of the second predetermined number, and the deviation comparator compares the deviation calculated by the deviation calculator with the predetermined deviation. When the results of the comparison in the deviation comparator show that the deviation is smaller than the predetermined steering angle, the statistical value calculator is allowed to calculate the statistical value of the steering angles stored in the second memory or the statistical value of the currents stored in the second memory. Therefore, no torque sensor is required, it is possible to detect the steering angle middle point with high precision without being affected by driving habits of drivers and road conditions, and it is also possible to reduce the memory size. Moreover, when the steering angles (hypothetical steering angle middle point) or the currents (hypothetical current middle point), stored in the second memory, vary to a great degree, these are redetected so that it is possible to improve the precision of the detecting operation.

Moreover, the power steering apparatus of the present invention is characterized in that it is provided with the above-mentioned steering angle middle point detecting device.

Here, in addition to the application to so-called hydraulic power steering apparatuses which carry out a steering assist by using an electric-motor-driven hydraulic pump as the generation source of oil pressure, the above-mentioned invention may be applied to so-called electric power steering apparatuses which use an electric motor as the generation source of a steering assist force, as well as to steering angle middle point detecting devices used in these power steering apparatuses and vehicles having these power steering apparatuses.

The above and further objects and features of the invention will more fully be apparent from the following detailed description with accompanying drawings.

BRIEF DESCRIPTION OF THE SEVERAL VIEWS OF THE DRAWINGS

FIG. 4 is a flow chart that shows operations of a steering angle middle point detecting device of the present invention;

FIG. 5 is a flow chart that shows operations of a steering angle middle point detecting device of the present invention;

FIG. 6 is a flow chart that shows operations of another steering angle middle point detecting device of the present invention; and FIG. 7 is a flow chart that shows operations of another steering angle middle point detecting device of the present invention.

DETAILED DESCRIPTION OF THE INVENTION

Referring to Figures, the following description will discuss embodiments of the present invention in detail.

Figure 1:
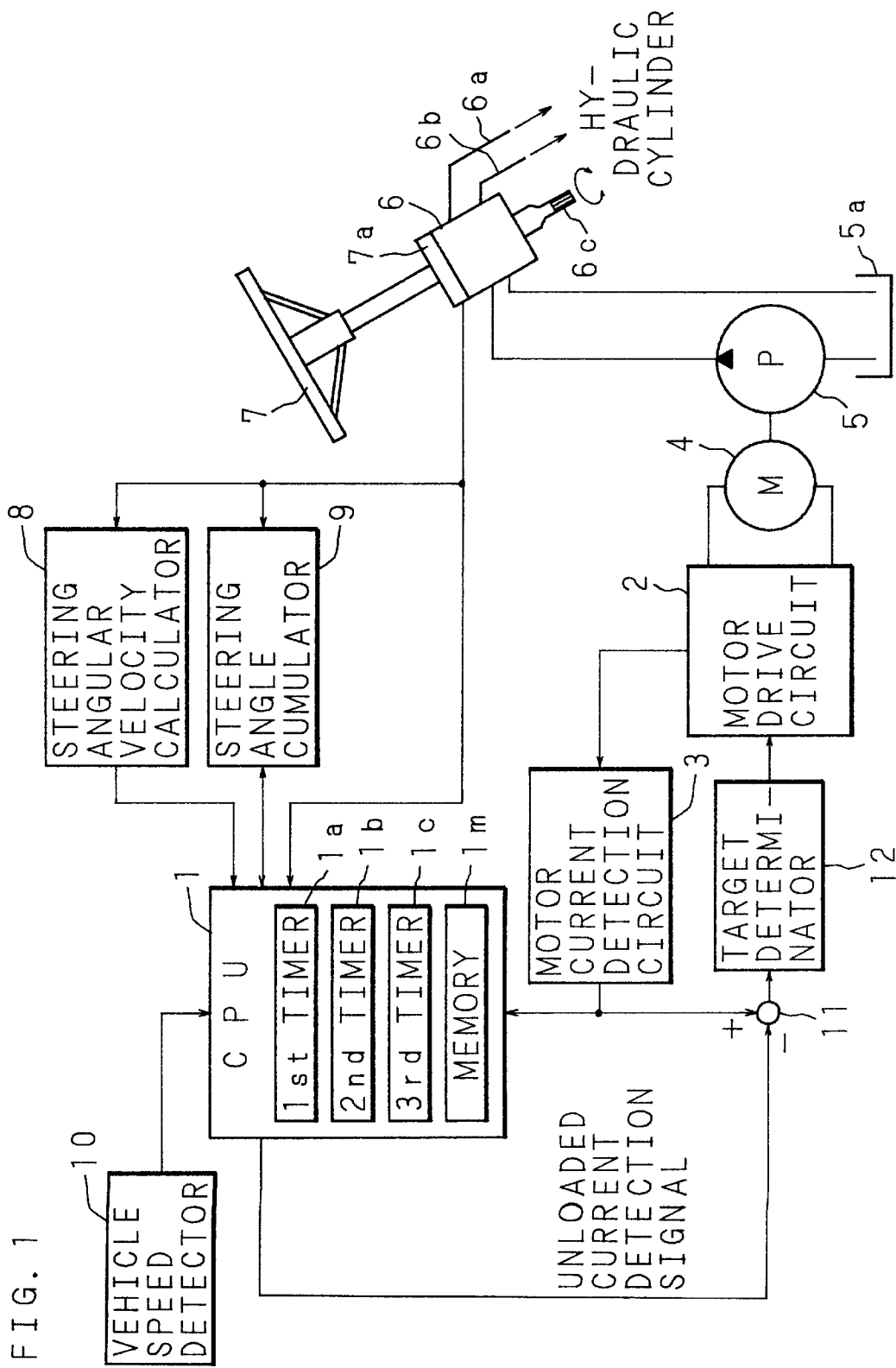
FIG. 1 is a block diagram that shows the construction of an essential part of a steering angle middle point detecting device and a power steering apparatus according to an embodiment of the present invention.

FIG. 1 is a block diagram that shows the construction of an essential part of a steering angle middle point detecting device and a power steering apparatus according to an embodiment of the present invention. In this power steering apparatus, in accordance with a target value of applied voltage that is instructed by a target determinator 12, a motor drive circuit 2 applies a voltage to an electric motor (M) 4 so as to rotate it. The electric motor 4 drives a hydraulic pump (P) 5 so as to allow it to discharge operating fluid to a control valve 6, thereby generating an oil pressure.

When a steering wheel 7 is operated and a gear device (not shown) including a pinion gear 6c attached to the lower end of a steering wheel shaft is actuated, the control valve 6 controls the oil pressure sent out to pipe lines 6a and 6b that connect to a hydraulic cylinder (not shown). Thus, the hydraulic cylinder is actuated so that a steering assist force corresponding to the amount of the steering operation is generated in the operating direction of the steering wheel 7.

The operating fluid circulates a hydraulic circuit constituted by the hydraulic pump 5, the control valve 6, the hydraulic cylinder, an oil supply tank 5a, etc.

Figure 2:
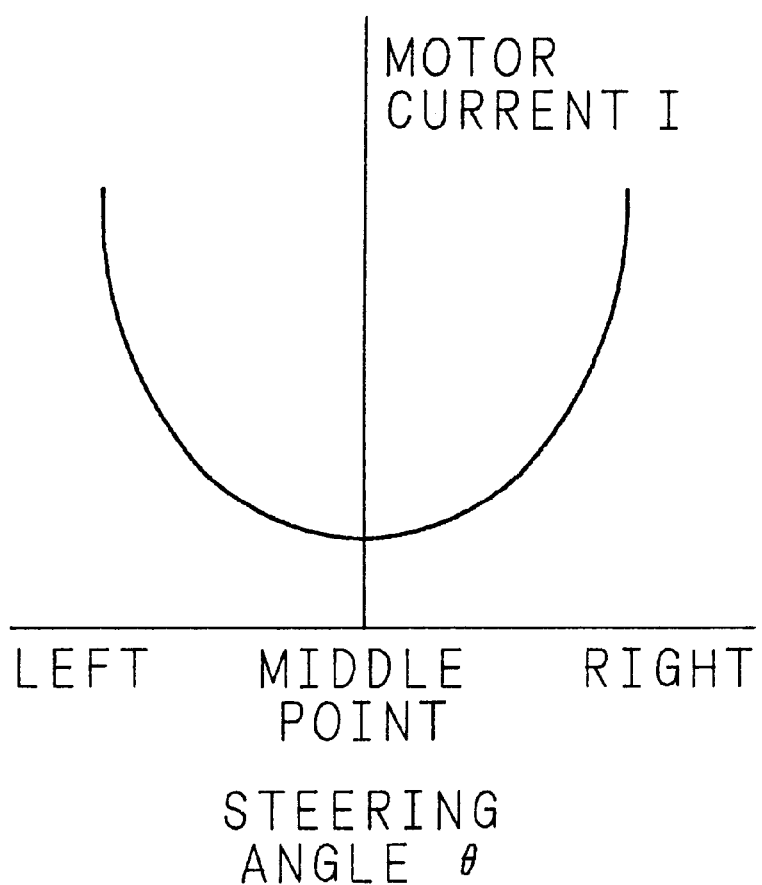
FIG. 2 is an explanatory drawing that shows a driving current of an electric motor shown in FIG. 1 in accordance with a steering angle from the middle point of the steering wheel.
Figure 3:
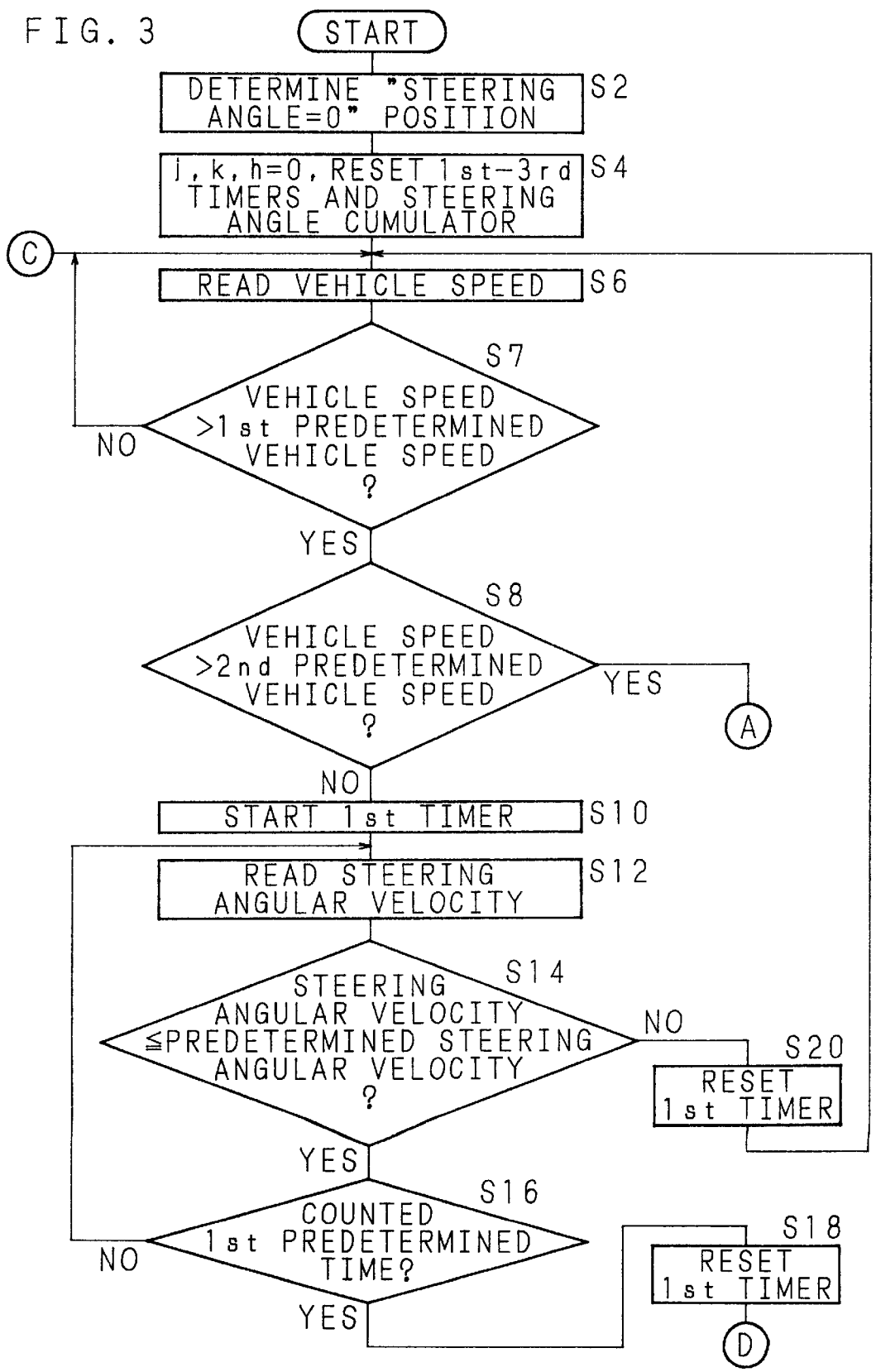
FIG. 3 is a flow chart that shows operations of a steering angle middle point detecting device of the present invention.

A motor current detection circuit 3 (current detector) for detecting motor current (drive current) I flowing through the electric motor 4 is connected to the motor drive circuit 2, and motor current I is allowed to have a size corresponding to a steering angle θ from the middle point of the steering wheel 7, as shown in FIG. 2. Moreover, the motor current detection circuit 3 generates a motor current detection signal and inputs it to a CPU 1 and a calculation circuit 11.

The CPU 1 detects and holds the motor current detection signal (current middle point detection signal) that is released when the steering angle of the steering wheel 7 is located at the middle point with the power steering apparatus being unloaded, while taking into account the motor current that varies depending on oil temperatures. The calculation circuit 11 subtracts the unloaded current detection signal outputted by the CPU 1 from the motor current detection signal outputted by the motor current detection circuit 3, thereby outputting the amount of increase of the motor current detection signal in comparison with that of unloaded condition of the power steering apparatus to the target determinator 12.

The target determinator 12 controls the voltage to be applied to the electric motor 4 so as to be switched to high or low based upon the amount of increase of the motor current detection signal in comparison with that of unloaded condition of the power steering apparatus.

A steering angle detector 7a is attached to the steering wheel shaft of the steering wheel 7, constituted by a rotary encoder, etc., for detecting the steering angle of the steering wheel 7. A steering angle signal outputted from the steering angle detector 7a is given to a steering angular velocity calculator 8, and the angular velocity is calculated based on the variation thereof. Moreover, the steering angle signal is also given to a steering angle cumulator 9 so that the variation thereof is counted during a period instructed by the CPU 1 so as to find a cumulated steering angle.

Furthermore, a vehicle speed signal, detected by a vehicle speed detector 10 for detecting the travelling speed of a vehicle, is given to the CPU 1. The CPU 1 specifies the steering angle middle point and the current middle point (unloaded current) based upon the vehicle speed signal, the steering angle signal outputted from the steering angle detector 7a, the steering angular velocity signal as the result of the calculation in the steering angular velocity calculator 8, the cumulated steering angle signal cumulated by the steering angle cumulator 9 and the motor current detection signal outputted from the motor current detection circuit 3.

The following description will discuss the operation of a power steering apparatus having the above-mentioned arrangement.

In the power steering apparatus of this type, when the steering wheel 7 is not operated and no steering assist force is required (that is, a current flowing through the electric motor 4 is small), the target determinator 12 lowers the target value of a voltage to be applied to the electric motor 4 so as to reduce energy consumption, thereby reducing the output of the electric motor 4.

In contrast, when the steering wheel 7 is operated and the control valve 6 is actuated, the oil pressure increases. The increase in the oil pressure causes an increase in the load of the electric motor 4, thereby increasing the current flowing through the electric motor 4. Moreover, when the amount of increase in the motor current detection signal outputted from the calculation circuit 11 in comparison with the unloaded current detection signal outputted from the CPU 1 has reached a predetermined value, the target determinator 12 raises the target value of the voltage to be applied to the electric motor 4 so that the output of the electric motor 4 is increased so as to generate a steering assist force.

In the case when the vehicle speed detected by the vehicle speed detector 10 is higher than a first predetermined vehicle speed (for example, "5 km/h")(which indicates that the vehicle is in travel), and also lower than a second predetermined vehicle speed (for example, "50 km/h"), if the steering angular velocity calculated by the steering angular velocity calculator 8 is approximately "zero" continuously during a first predetermined time (for example, "1 second") defined as a predetermined period of time, the steering angle middle point detecting device respectively samples a steering angle $\theta_k$ from the steering angle detector 7a and a current $I_k$ from the motor current detection circuit 3, thereby allowing a built-in memory 1m (first memory) in the CPU 1 to store them.

When the number of pairs of the steering angle $\theta_k$ and the current $I_k$ have reached a predetermined number "n" (for example "3"), the steering angle middle point detecting device selects the pair containing the minimum current, and stores them in the memory 1m (second memory) as a hypothetical steering angle middle point $\theta_h$ and a hypothetical current middle point $I_h$.

When the number of pairs of the hypothetical steering angle middle point $\theta_h$ and hypothetical current middle point $I_h$, stored in the memory 1m, have reached a second predetermined number "m" (for example, "2"), the steering angle middle point detecting device calculates the deviation between "m" number of hypothetical steering angle middle points oh. Then, if no variation is found among the m number of hypothetical steering angle middle points $\theta_h$ that is, if the m number of hypothetical steering angle middle points $\theta_h$ are approximately the same, it calculates an average value as a statistical value of the hypothetical steering angle middle points $\theta_h$, and selects this average value or one of the hypothetical steering angle middle points $\theta_h$ close to the average value, and defines it as a steering angle middle point $\theta_o$.

Here, instead of calculating the average value of the hypothetical steering angle middle points $\theta_h$, an average value of the hypothetical current middle points $I_h$ may be calculated so that this average value or one of the hypothetical current middle points $I_h$ close to the average value is selected and defined as a current middle point $I_o$.

However, in the case like when the vehicle is kept circling at constant rate, that is, the steering wheel is held at a position other than the steering angle middle point, and when many fluctuating steering operations are carried out around this holding position, the above-mentioned sampling method might cause offsets in the middle point.

For this reason, when, upon sampling the steering angle $\theta_k$ and current $I_k$, the cumulated steering angle since the previous sampling is not greater than a predetermined amount (for example, "30 degrees"), the steering angle middle point detecting device is allowed to refrain from sampling.

In other words, when a vehicle is travelling at a high speed (for example, "100 km/h"), great steering operations are hardly carried out. Therefore, the above-mentioned middle point detecting operation is not carried out.

Consequently, the steering angle middle point detecting device carries out the following middle point detecting operation in the case when the vehicle speed detected by the vehicle speed detector 10 is higher than the second predetermined vehicle speed (for example, "50 km/h").

In the case when the vehicle speed detected by the vehicle speed detector 10 is higher than a second predetermined vehicle speed, if the steering angular velocity calculated by the steering angular velocity calculator 8 is approximately "zero" continuously during a second predetermined time (for example, "10 seconds"), the steering angle middle point detecting device respectively samples a steering angle $\theta_j$ from the steering angle detector 7a and a current $I_j$ from the motor current detection circuit 3, and defines them as a hypothetical steering angle middle point $\theta_j$ and a hypothetical current middle point $I_j$, thereby allowing the memory 1m to store them.

When the number of pairs of the hypothetical steering angle middle point $\theta_j$ and hypothetical current middle point $I_j$, stored in the memory 1m have reached a third predetermined number "p" (for example, "2"), the steering angle middle point detecting device calculates the deviation between "p" number of hypothetical steering angle middle points $\theta_j$. Then, if no variation is found among the "p" number of hypothetical steering angle middle points $\theta_j$, that is, the "p" number of hypothetical steering angle middle points $\theta_j$ are approximately the same, it calculates an average value of the hypothetical steering angle middle points $\theta_j$, and selects this average value or one of the hypothetical steering angle middle points $\theta_j$ close to the average value, and defines it as the steering angle middle point $\theta_o$.

Here, instead of calculating the average value of the hypothetical steering angle middle points $\theta_j$, the average value of the hypothetical current middle points $I_j$ may be calculated so that this average value or one of the hypothetical current middle points $I_j$ close to the average value is selected and defined as the current middle point $I_a$.

In the above-mentioned sampling method, the middle point is determined, for example, in "20 seconds"; however, there is a possibility that a period of circular travel time exceeds "20 seconds" along a long curve having a constant radius, i.e. on freeways.

For this reason, in the case when, upon sampling the steering angle $\theta_j$ and the current $I_j$, a third predetermined period (for example, "30 seconds") has not elapsed since the previous sampling, the steering angle middle point detecting device is allowed to refrain from sampling.

FIGS. 3 through 7 are flow charts that show the operations of steering angle middle point detecting devices according to the present invention. Referring to the flow charts of FIGS. 3 through 7, the following description will discuss the operation of each of the steering angle middle point detecting devices.

Upon turning on the power switch of a power steering apparatus, the CPU 1 defines a steering angle detected by the steering angle detector 7a as position "0" in terms of the steering angle (S2). Next, the CPU 1 resets parameters j, k, and h at "0", and resets a first timer 1a (timer), second timer 1b, and third timer 1c that are built therein as well as the steering angle cumulator 9 (S4).

Next, the CPU 1 reads a vehicle speed from the vehicle speed detector 10 (S6), and compares it with the first predetermined vehicle speed (for example, "5 km/h")(S7). If the read vehicle speed is higher than the first predetermined vehicle speed, the CPU 1 compares it with the second predetermined vehicle speed (for example, "50 km/h")(S8), and if the read vehicle speed is lower than the second predetermined vehicle speed, it allows the first timer 1a to start (S10).

Here, at S7, if the read vehicle speed is not more than the first predetermined speed (for example, "5 km/h"), the sequence returns to S6, and the CPU 1 newly reads a vehicle speed from the vehicle speed detector 10.

After allowing the first timer 1a to start at S10, the CPU 1 reads a steering angular velocity from the steering angular velocity calculator 8 (S12), and compares it with a predetermined steering angular velocity close to "0" (S14).

The reading process of the steering angular velocity at S12 and the comparing process between the steering angular velocity and the predetermined steering angular velocity at S14 are repeated a plurality of times in accordance with a sampling cycle of the CPU 1. At this time, if, during a period of time from the time when the first timer 1a has counted the first predetermined time (for example, "1 second") (S16) until it is reset (S18), the read steering angular velocity is continuously lower than the predetermined steering angular velocity, that is, if the steering angular velocity is approximately "0" continuously at S14, the CPU 1 checks to see if the parameter k is "0" (S22).

Here, if, between the time when the first timer 1a has counted the first predetermined time at S16 and the time when it is reset at S18, the read steering angular velocity becomes higher than the predetermined steering angular velocity at S14, the CPU 1 resets the timer 1a (S20). Then, the sequence returns to S6, and the CPU 1 reads a vehicle speed from the vehicle speed detector 10, and newly starts sampling so as to make comparison with the first predetermined vehicle speed at S7.

If the parameter k is "0" at S22, the CPU 1 reads a steering angle $\theta_k$ from the steering angle detector 7a, and also reads a current $I_k$ from the motor current detection circuit 3, and stores them in the memory 1m (S24). Next, the CPU 1 adds "1" to the parameter k (S26), and then checks to see if the parameter k has reached the first predetermined number "n" (for example, "3")(S28).

When the parameter k has not reached the first predetermined number "n" at S28, the CPU 1 allows the steering angle cumulator 9 to start cumulating the steering angles (S48), and the sequence returns to S6 where the CPU 1 reads a vehicle speed from the vehicle speed detector 10, and newly starts sampling so as to make comparison with the first predetermined vehicle speed at S7.

If the parameter k is not "0" at S22, the CPU 1 reads the cumulated steering angle since the previous reading processes of the steering angle $\theta_k$ and current $I_k$ from the steering angle cumulator 9 (S42), and compares it with a predetermined amount (for example, "30 degrees")(S44). If the read cumulated steering angle is not less than the predetermined amount, the CPU 1 resets the steering angle cumulator 9 (S46), and then the sequence returns to S24 where the CPU 1 reads a steering angle $\theta_k$ from the steering angle detector 7a, reads a current $I_k$ from the motor current detection circuit 3, and stores them in the memory 1m.

If the cumulated steering angle thus read is smaller than the predetermined amount at S44, the sequence returns to S6 where the CPU 1 reads a vehicle speed from the vehicle speed detector 10, and newly starts sampling so as to make comparison with the first predetermined vehicle speed at S7.

Here, if the parameter k has reached the first predetermined number "n" at S28, the CPU 1 resets the parameter k to "0" (S30), and selects the pair containing the minimum current $I_k$ out of the "n" number of pairs of the steering angle $\theta_k$ and current $I_k$, and stores them in the memory 1m as a hypothetical steering angle middle point $\theta_h$ and a hypothetical current middle point $I_h$ (S32), and adds "1" to the parameter h (S34).

Next, the CPU 1 checks to see whether the parameter h has reached the second predetermined number "m" (for example, "2")(S36), and if the parameter h has not reached the second predetermined number "m", the sequence returns to S6 where the CPU 1 reads a vehicle speed from the vehicle speed detector 10, and newly starts sampling so as to make comparison with the first predetermined vehicle speed at S7.

However, if the parameter h has reached the second predetermined number "m" at S36, the CPU 1 calculates the deviation among the "m" number of the hypothetical steering angle middle points $\theta_h$, and compares the deviation with a predetermined steering angle (S38). If no variation is found among the "m" number of the hypothetical steering angle middle points $\theta_h$ at S38, that is, the deviation is not more than the predetermined steering angle, the CPU 1 calculates the average value of the "m" number of the hypothetical steering angle middle points $\theta_h$ (S39), and selects this average value or one of the hypothetical steering angle middle points $\theta_h$ close to the average value so as to define it as the steering angle middle point $\theta_o$ (S40).

In contrast, if any variation is found among the "m" number of the hypothetical steering angle middle points $\theta_h$ at S38 and if the deviation is greater than the predetermined steering angle, the CPU 1 resets the parameter h to "0" (S49), and the sequence returns to S6 where the CPU 1 reads a vehicle speed from the vehicle speed detector 10, and newly starts sampling so as to make comparison with the first predetermined vehicle speed at S7.

Here, as indicated by a flow chart with another pattern in FIG. 6, if no variation is found among the "m" number of hypothetical steering angle middle points $\theta_h$ at S38, that is, the deviation is not more than the predetermined steering angle, the CPU 1 may calculate the average value of the "m" number of hypothetical current middle points $I_h$ (S80), and select this average value or one of the hypothetical current middle points $I_h$ close to the average value so as to define it as a current middle point $I_o$ (S82). In this case, since the other operations of the flow chart of FIG. 6 are the same as those of the flow chart of FIG. 4, the description thereof is omitted.

Next, If the vehicle speed read from the vehicle speed detector 10 at S6 is higher than the first predetermined vehicle speed (for example, "5 km/h") at S7 and if it is higher than the second predetermined vehicle speed (for example, "50 km/h") at S8, it allows the second timer 1b to start (S50).

After allowing the second timer 1b to start at S50, the CPU 1 reads a steering angular velocity from the steering angular velocity calculator 8 (S52), and compares it with the predetermined steering angular velocity that is close to "0" (S54).

Then, the reading process of the steering angular velocity at S52 and the comparing process between the steering angular velocity and the predetermined steering angular velocity at S54 are repeated a plurality of times in accordance with a sampling cycle of the CPU 1, and if, during a period of time from the time when the second timer 1b has counted the second predetermined time (for example, "10 seconds") (S56) until it is reset (S58), the steering angular velocity that has been read is continuously lower than the predetermined steering angular velocity at S54, that is, if the steering angular velocity is approximately "0" continuously, the CPU 1 checks to see if the parameter j is "0" (S60).

Here, if, between the time when the second timer 1b has counted the second predetermined time at S56 and the time when it is reset at S58, the read steering angular velocity becomes higher than the predetermined steering angular velocity at S54, the CPU 1 resets the second timer 1b (S70). Then, the sequence returns to S6, and the CPU 1 reads a vehicle speed from the vehicle speed detector 10, and newly starts sampling so as to make comparison with the first predetermined vehicle speed at S7.

If the parameter j is "0" at S60, the CPU 1 reads a steering angle $\theta_j$ from the steering angle detector 7a, and also reads a current $I_j$ from the motor current detection circuit 3, and stores them in the memory 1m respectively as a hypothetical steering angle middle point $\theta_j$ and a hypothetical current middle point $I_j$ (S62). Next, the CPU 1 adds "1" to the parameter j (S64), and then checks to see if the parameter j has reached the third predetermined number "p" (for example, "2")(S66).

When the parameter j has not reached the third predetermined number "p" at S66, the CPU 1 allows the third timer 1c to start (S76), and the sequence returns to S6 where the CPU 1 reads a vehicle speed from the vehicle speed detector 10, and newly starts sampling so as to make comparison with the first predetermined vehicle speed at S7.

If the parameter j is not "0" at S60, the CPU 1 checks to see whether the third timer 1c has counted the third predetermined time (for example, "30 seconds") since the hypothetical steering angle middle point $\theta_j$ and the hypothetical current middle point $I_j$ were previously read (S72). If the third predetermined time has been counted, the CPU 1 resets the third timer 1c (S74), and the sequence returns to S63 where it reads a steering angle $\theta_j$ from the steering angle detector 7a and also reads a current $I_j$ from the motor current detection circuit 3, and stores them in the memory 1m respectively as a hypothetical steering angle middle point $\theta_j$ and a hypothetical current middle point $I_j$.

Moreover, if the third timer 1c has not counted the third predetermined time at S72, the sequence returns to S6 where the CPU 1 reads a vehicle speed from the vehicle speed detector 10, and newly starts sampling so as to make comparison with the first predetermined vehicle speed at S7.

Here, if the parameter j has reached the third predetermined number "p" at S66, the CPU 1 calculates the deviation among the "p" number of the hypothetical steering angle middle points $\theta_j$, and compares the deviation with a predetermined steering angle (S67). If no variation is found among the "p" number of hypothetical steering angle middle points $\theta_j$ at S67, and if the deviation is not more than the predetermined steering angle, the CPU 1 calculates the average value of the "p" number of hypothetical steering angle middle points $\theta_j$ (S68), and selects this average value or one of the hypothetical steering angle middle points $\theta_j$ close to the average value so as to define it as the steering angle middle point $\theta_o$ (S69).

In contrast, if any variation is found among the "p" number of the hypothetical steering angle middle points $\theta_j$ at S67 and if the deviation is greater than the predetermined steering angle, the CPU 1 resets the parameter j to "0" and also resets the third timer 1c (S78), and the sequence returns to S6 where the CPU 1 reads a vehicle speed from the vehicle speed detector 10, and newly starts sampling so as to make comparison with the first predetermined vehicle speed at S7.

Here, as indicated by a flow chart with another pattern in FIG. 7, if no variation is found among the "p" number of hypothetical steering angle middle points $\theta_j$ at S67, and if the deviation is not more than the predetermined steering angle, the CPU 1 may calculate the average value of the "p" number of hypothetical current middle points $I_j$ (S84), and select this average value or one of the hypothetical current middle points $I_j$ close to the average value so as to define it as a current middle point $I_o$ (S86). In this case, since the other operations of the flow chart of FIG. 7 are the same as those of the flow chart of FIG. 5, the description thereof is omitted.

In the above-mentioned embodiments, the average value of the hypothetical steering angle middle points or the hypothetical current middle points is calculated, and either the average value or one of the hypothetical steering angle middle points or the hypothetical current middle points that is close to the average value is selected so as to defined a steering angle middle point $\theta_o$ or current middle point $I_o$; however, the present invention is not intended to be limited by the average value, and other statistical values, such as mode, median, or the like, may be used.

As described above, in the steering angle middle point detecting device and the power steering apparatus of the present invention, no torque sensor is required, it is possible to detect the steering angle middle point with high precision without being affected by driving habits of drivers and road conditions, and it is also possible to reduce the memory size.

Additionally, in the above-mentioned embodiments, explanations were given by exemplifying so-called hydraulic power steering apparatuses assist steering by using an electric motor driven hydraulic pump as the generation source of oil pressure; however, the above-mentioned invention may also be applied to so-called electric power steering apparatuses which use an electric motor as the generation source of a steering assist force, as well as to steering angle middle point detecting devices used in these power steering apparatuses and vehicles having these power steering apparatuses.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A steering angle middle point detecting device, for detecting a steering angle middle point of a steering wheel of a vehicle having a power steering apparatus which assists steering by an electric motor provided therein, while the vehicle travels straight, comprising:

a steering angle detector for detecting a steering angle of the steering wheel;

a vehicle speed detector for detecting a speed of the vehicle;

a vehicle speed comparator for comparing the speed detected by said vehicle speed detector with a predetermined speed;

a current detector for detecting a drive current of the electric motor;

a steering angular velocity calculator for calculating a steering angular velocity based on the steering angle detected by said steering angle detector;

a steering angular velocity comparator for comparing the steering angular velocity calculated by said steering angular velocity calculator with a predetermined steering angular velocity;

a timer for counting a continuous time period during which, the speed detected by said vehicle speed detector is higher than the predetermined speed based on a comparison result of said vehicle speed comparator, and also during which, the steering angular velocity calculated by said steering angular velocity calculator is lower than the predetermined steering angular velocity based on a comparison result of said steering angular velocity comparator;

a first memory for storing the steering angle detected by said steering angle detector and the current detected by said current detector each time said timer counts a predetermined time;

a second memory for storing a pair of the steering angle and current including the minimum current each time the number of the pairs stored in said first memory reaches a first predetermined number;

a statistical value calculator for calculating a statistical value of the steering angles stored in said second memory; and a selector for selecting either the statistical value calculated by said statistical value calculator or one of the steering angles stored in said second memory as the steering angle middle point.

2. The steering angle middle point detecting device according to claim 1, further comprising:

a steering angle cumulator for cumulating the steering angles detected by said steering angle detector, from the time when said first memory stored the pair of the steering angle and current until said timer has counted the predetermined time; and a cumulated value comparator for comparing the cumulated value cumulated by said steering angle cumulator with a predetermined value, wherein said first memory stores the steering angle detected by said steering angle detector and the current detected by said current detector when the cumulated value is greater than the predetermined value based on a comparison result of said cumulated value comparator.

3. The steering angle middle point detecting device according to claim 1, further comprising:

a deviation calculator for calculating a deviation of the steering angles of a second predetermined number each time the number of pairs of the steering angle and current stored in said first memory reaches the second predetermined number; and a deviation comparator for comparing the deviation calculated by said deviation calculator with a predetermined deviation, wherein said statistical value calculator calculates the statistical value when the deviation is smaller than the predetermined deviation based on a comparison result of said deviation comparator.

4. The steering angle middle point detecting device according to claim 2, further comprising:

a deviation calculator for calculating a deviation of the steering angles of a second predetermined number each time the number of pairs of the steering angle and current stored in said first memory reaches the second predetermined number; and a deviation comparator for comparing the deviation calculated by said deviation calculator with a predetermined deviation, wherein said statistical value calculator calculates the statistical value when the deviation is smaller than the predetermined deviation based on a comparison result of said deviation comparator.

5. A steering angle middle point detecting device, for detecting a steering angle middle point of a steering wheel of a vehicle having a power steering apparatus while the vehicle travels straight, by detecting a current middle point of an electric motor for steering assistance provided in the power steering apparatus, comprising:

a steering angle detector for detecting a steering angle of the steering wheel;

a vehicle speed detector for detecting a speed of the vehicle;

a vehicle speed comparator for comparing the speed detected by said vehicle speed detector with a predetermined speed;

a current detector for detecting a drive current of the electric motor;

a steering angular velocity calculator for calculating a steering angular velocity based on the steering angle detected by said steering angle detector;

a steering angular velocity comparator for comparing the steering angular velocity calculated by said steering angular velocity calculator with a predetermined steering angular velocity;

a timer for counting a continuous time period during which, the speed detected by said vehicle speed detector is higher than the predetermined speed based on a comparison result of said vehicle speed comparator, and also during which, the steering angular velocity calculated by said steering angular velocity calculator is lower than the predetermined steering angular velocity based on a comparison result of said steering angular velocity comparator;

a first memory for storing the steering angle detected by said steering angle detector and the current detected by said current detector each time said timer counts a predetermined time;

a second memory for storing a pair of the steering angle and current including the minimum current each time the number of the pairs stored in said first memory reaches a first predetermined number;

a statistical value calculator for calculating a statistical value of the current stored in said second memory; and a selector for selecting either the statistical value calculated by said statistical value calculator or one of the currents stored in said second memory as the current middle point.

6. The steering angle middle point detecting device according to claim 5, further comprising:

a steering angle cumulator for cumulating the steering angles detected by said steering angle detector, from the time when said first memory stored the pair of the steering angle and current until said timer has counted the predetermined time; and a cumulated value comparator for comparing the cumulated value cumulated by said steering angle cumulator with a predetermined value, wherein said first memory stores the steering angle detected by said steering angle detector and the current detected by said current detector when the cumulated value is greater than the predetermined value based on a comparison result of said cumulated value comparator.

7. The steering angle middle point detecting device according to claim 5, further comprising:

a deviation calculator for calculating a deviation of the steering angles of a second predetermined number each time the number of pairs of the steering angle and current stored in said first memory reaches the second predetermined number; and a deviation comparator for comparing the deviation calculated by said deviation calculator with a predetermined deviation, wherein said statistical value calculator calculates the statistical value when the deviation is smaller than the predetermined deviation based on a comparison result of said deviation comparator.

8. The steering angle middle point detecting device according to claim 6, further comprising:

a deviation calculator for calculating a deviation of the steering angles of a second predetermined number each time the number of pairs of the steering angle and current stored in said first memory reaches the second predetermined number; and a deviation comparator for comparing the deviation calculated by said deviation calculator with a predetermined deviation, wherein said statistical value calculator calculates the statistical value when the deviation is smaller than the predetermined deviation based on a comparison result of said deviation comparator.

9. A power steering apparatus, for assisting an operation of a steering wheel of a vehicle based on a steering angle middle point of the steering wheel while the vehicle travels straight, comprising:

a steering angle detector for detecting a steering angle of the steering wheel;

a vehicle speed detector for detecting a speed of the vehicle;

a vehicle speed comparator for comparing the speed detected by said vehicle speed detector with a predetermined speed;

an electric motor for steering assistance;

a current detector for detecting a drive current of said electric motor;

a steering angular velocity calculator for calculating a steering angular velocity based on the steering angle detected by said steering angle detector;

a steering angular velocity comparator for comparing the steering angular velocity calculated by said steering angular velocity calculator with a predetermined steering angular velocity;

a timer for counting a continuous time period during which, the speed detected by said vehicle speed detector is higher than the predetermined speed based on a comparison result of said vehicle speed comparator, and also during which, the steering angular velocity calculated by said steering angular velocity calculator is lower than the predetermined steering angular velocity based on a comparison result of said steering angular velocity comparator;

a first memory for storing the steering angle detected by said steering angle detector and the current detected by said current detector each time said timer counts a predetermined time;

a second memory for storing a pair of the steering angle and current including the minimum current each time the number of the pairs stored in said first memory reaches a first predetermined number;

a statistical value calculator for calculating a statistical value of the steering angles stored in said second memory; and a selector for selecting either the statistical value calculated by said statistical value calculator or one of the steering angles stored in said second memory as the steering angle middle point.

10. The power steering apparatus according to claim 9, further comprising:

a steering angle cumulator for cumulating the steering angles detected by said steering angle detector, from the time when said first memory stored the pair of the steering angle and current until said timer has counted the predetermined time; and a cumulated value comparator for comparing the cumulated value cumulated by said steering angle cumulator with a predetermined value, wherein said first memory stores the steering angle detected by said steering angle detector and the current detected by said current detector when the cumulated value is greater than the predetermined value based on a comparison result of said cumulated value comparator.

11. The power steering apparatus according to claim 9, further comprising:

a deviation calculator for calculating a deviation of the steering angles of a second predetermined number each time the number of pairs of the steering angle and current stored in said first memory reaches the second predetermined number; and a deviation comparator for comparing the deviation calculated by said deviation calculator with a predetermined deviation, wherein said statistical value calculator calculates the statistical value when the deviation is smaller than the predetermined deviation based on a comparison result of said deviation comparator.

12. The power steering apparatus according to claim 10, further comprising:

a deviation calculator for calculating a deviation of the steering angles of a second predetermined number each time the number of pairs of the steering angle and current stored in said first memory reaches the second predetermined number; and a deviation comparator for comparing the deviation calculated by said deviation calculator with a predetermined deviation, wherein said statistical value calculator calculates the statistical value when the deviation is smaller than the predetermined deviation based on a comparison result of said deviation comparator.

13. A power steering apparatus, for assisting an operation of a steering wheel of a vehicle based on a steering angle middle point of the steering wheel while the vehicle travels straight, comprising:

a steering angle detector for detecting a steering angle of the steering wheel;

a vehicle speed detector for detecting a speed of the vehicle;

a vehicle speed comparator for comparing the speed detected by said vehicle speed detector with a predetermined speed;

an electric motor for steering assistance;

a current detector for detecting a drive current of said electric motor;

a steering angular velocity calculator for calculating a steering angular velocity based on the steering angle detected by said steering angle detector;

a steering angular velocity comparator for comparing the steering angular velocity calculated by said steering angular velocity calculator with a predetermined steering angular velocity;

a timer for counting a continuous time period during which, the speed detected by said vehicle speed detector is higher than the predetermined speed based on a comparison result of said vehicle speed comparator, and also during which, the steering angular velocity calculated by said steering angular velocity calculator is lower than the predetermined steering angular velocity based on a comparison result of said steering angular velocity comparator;

a first memory for storing the steering angle detected by said steering angle detector and the current detected by said current detector each time said timer counts a predetermined time;

a second memory for storing a pair of the steering angle and current including the minimum current each time the number of the pairs stored in said first memory reaches a first predetermined number;

a statistical value calculator for calculating a statistical value of the currents stored in said second memory; and a selector for selecting either the statistical value calculated by said statistical value calculator or one of the currents stored in said second memory, wherein the selected result of said the selector is given as a current middle point of said electric motor corresponding to the steering angle middle point.

14. The power steering apparatus according to claim 13, further comprising:

a steering angle cumulator for cumulating the steering angles detected by said steering angle detector, from the time when said first memory stored the pair of the steering angle and current until said timer has counted the predetermined time; and a cumulated value comparator for comparing the cumulated value cumulated by said steering angle cumulator with a predetermined value, wherein said first memory stores the steering angle detected by said steering angle detector and the current detected by said current detector when the cumulated value is greater than the predetermined value based on a comparison result of said cumulated value comparator.

15. The power steering apparatus according to claim 13, further comprising:

a deviation calculator for calculating a deviation of the steering angles of a second predetermined number each time the number of pairs of the steering angle and current stored in said first memory reaches the second predetermined number; and a deviation comparator for comparing the deviation calculated by said deviation calculator with a predetermined deviation, wherein said statistical value calculator calculates the statistical value when the deviation is smaller than the predetermined deviation based on a comparison result of said deviation comparator.

16. The power steering apparatus according to claim 14, further comprising:

a deviation calculator for calculating a deviation of the steering angles of a second predetermined number each time the number of pairs of the steering angle and current stored in said first memory reaches the second predetermined number; and a deviation comparator for comparing the deviation calculated by said deviation calculator with a predetermined deviation, wherein said statistical value calculator calculates the statistical value when the deviation is smaller than the predetermined deviation based on a comparison result of said deviation comparator.

* * * * *